United States Patent Office 3,202,188
Patented Aug. 24, 1965

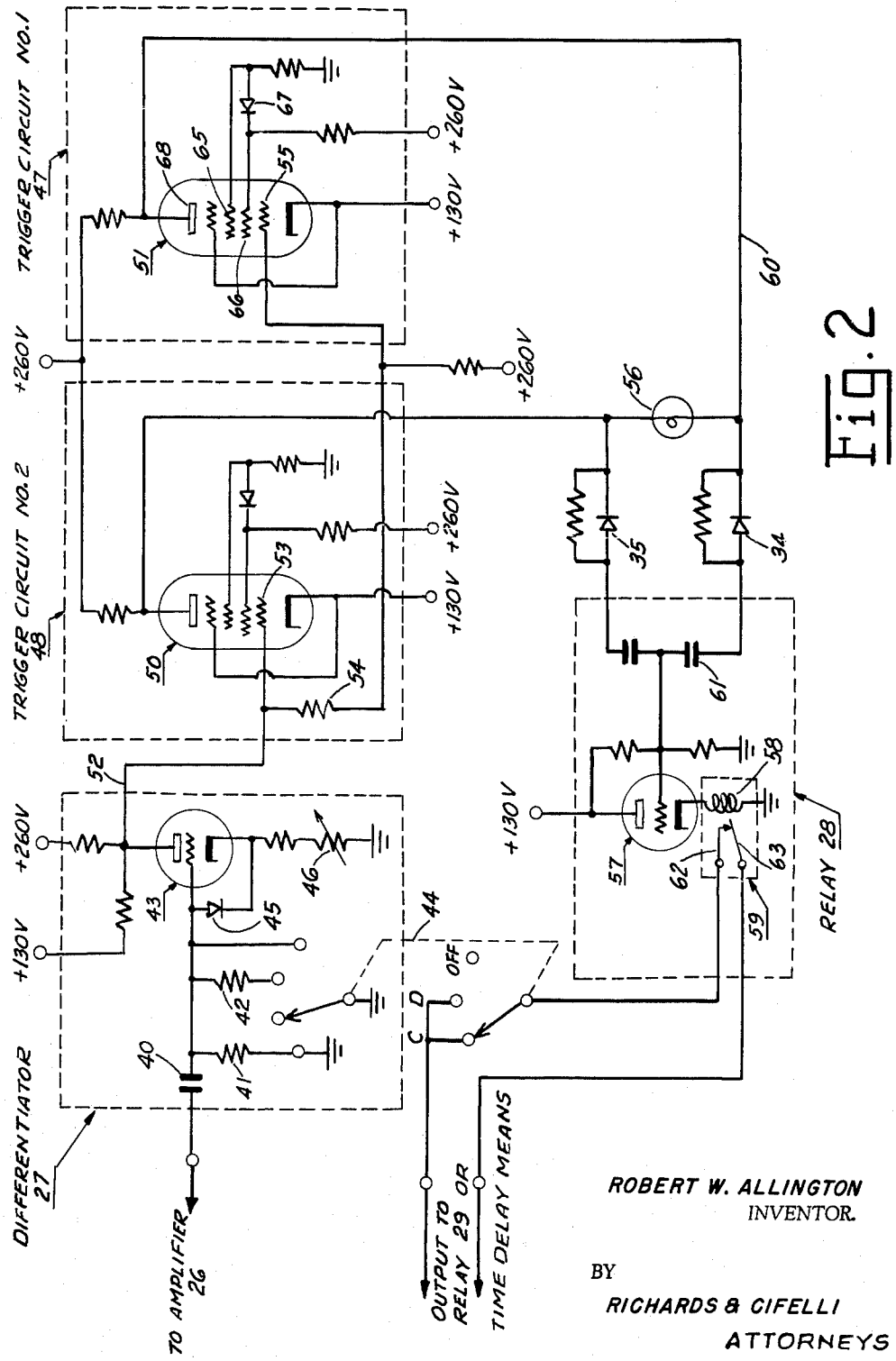

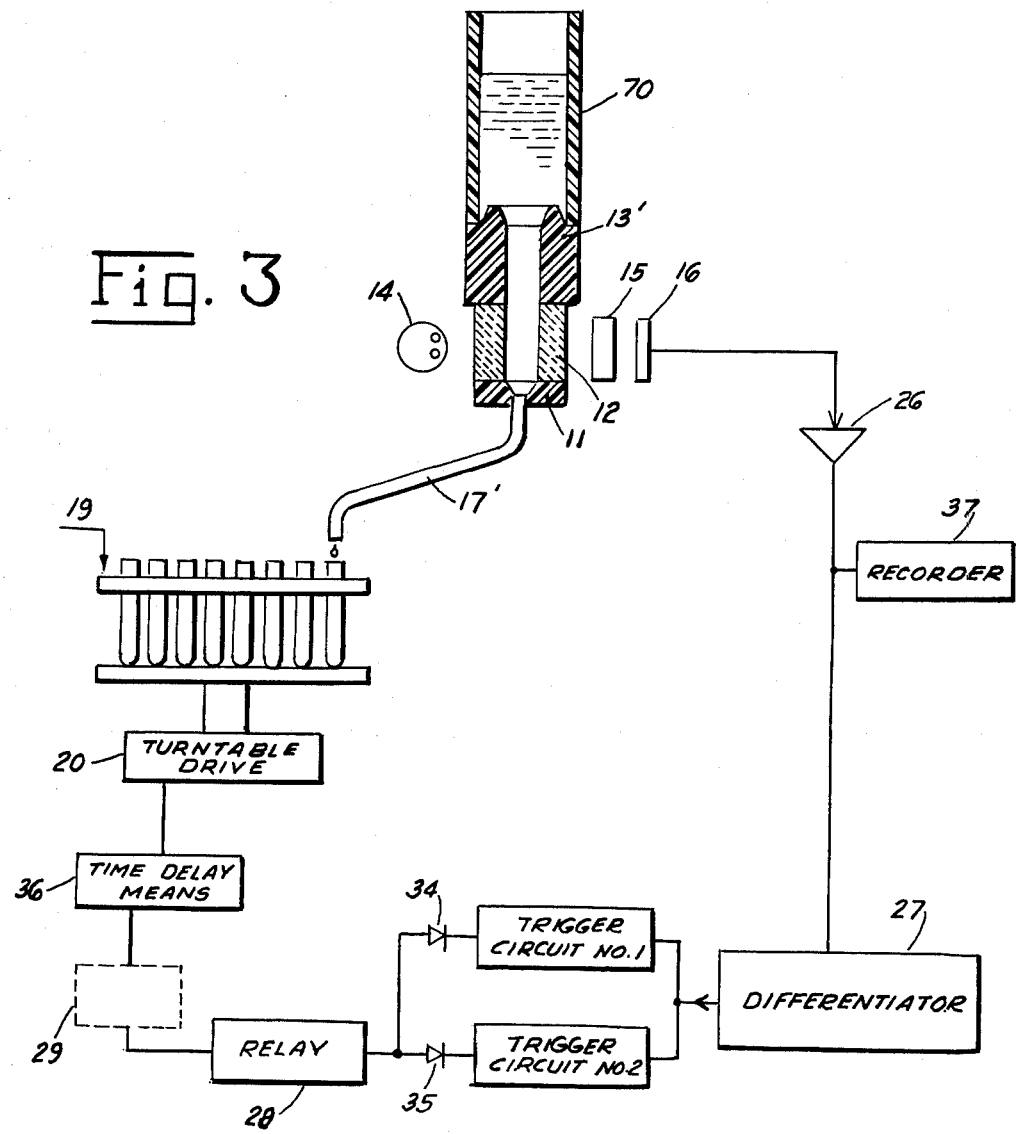

3,202,188
APPARATUS FOR MAKING CHEMICAL
SEPARATIONS
Robert W. Allington, Lincoln, Nebr., assignor to Instrumentation Specialties Company, Lincoln, Nebr., a corporation of Nebraska
Original application Oct. 23, 1961, Ser. No. 147,015.
Divided and this application Mar. 22, 1963, Ser.
No. 267,211
14 Claims. (Cl. 141—130)

This invention relates to apparatus for making chemical separations and more particularly to apparatus for transferring fractional material into separate receiving tubes.

The present application is a division of my copending application Serial No. 147,015, filed October 23, 1961, now Patent No. 3,151,639 dated October 6, 1964 and entitled, Apparatus For Making Chemical Separations. The prior-filed application discloses apparatus wherein an optical flow cell is disposed over a tube containing a density-gradient column, means for injecting a dense liquid into the bottom of the tube at a predetermined rate thereby to float the liquid upwardly out of the tube and through the optical cell. The optical cell is disposed in a light beam, which beam passes through a suitable light filter and impinges upon a photoelectric cell. The variations in the output of the photoelectric cell, corresponding to the light absorption of the liquid as it passes through the light beam, are utilized to effect a continuous measurement of the optical density of the flowing liquid and/or to effect the operation of a suitable fraction collector.

The present invention is directed to a generally similar apparatus which, however, is adapted for fractionating a density-gradient column or a chromatography column, and to novel circuitry for effecting proper operation of the fraction collector.

An object of this invention is the provision of apparatus for fractionating chemical mixtures.

An object of this invention is the provision of means for fractionating liquids on the basis of optical density which apparatus includes automatic means for directing samples of the liquid having different optical densities into separate test tubes.

An object of this invention is the provision of a novel density gradient fractionator which includes means for automatically collecting the fractionated samples in separate test tubes with a minimum mixing of the flow stream thereby greatly improving the resolution of the analysis.

An object of this invention is the provision of continuous fractionating apparatus which includes means for continuously measuring the optical density of the liquid being fractionated.

An object of this invention is the provision of apparatus for fractionating a chemical mixture comprising means for causing the liquid to flow through an optical cell positioned in a monochromatic light beam, light-sensitive means responsive to changes in the intensity of the light beam, a fraction collector carrying a plurality of collecting tubes, and means responsive to changes in the light-sensitive means to effect operation of the fraction collector, thereby to discharge liquids of different densities into separate collecting tubes.

These and other objects and advantages of the invention will become apparent from the following description when taken with the accompanying drawings. It will be understood, however, that the drawings are for purposes of description and are not to be construed as defining the scope or spirit of the invention, reference being had for the latter purpose to the claims appended hereto.

In the drawings wherein like reference numerals denote like parts in the several views:

FIGURE 2 is a simplified circuit diagram of the voltage differentiator, the two trigger circuits and the control relay; and FIGURE 3 is a schematic representation of apparatus made in accordance with another embodiment of the invention.

Figure 1:
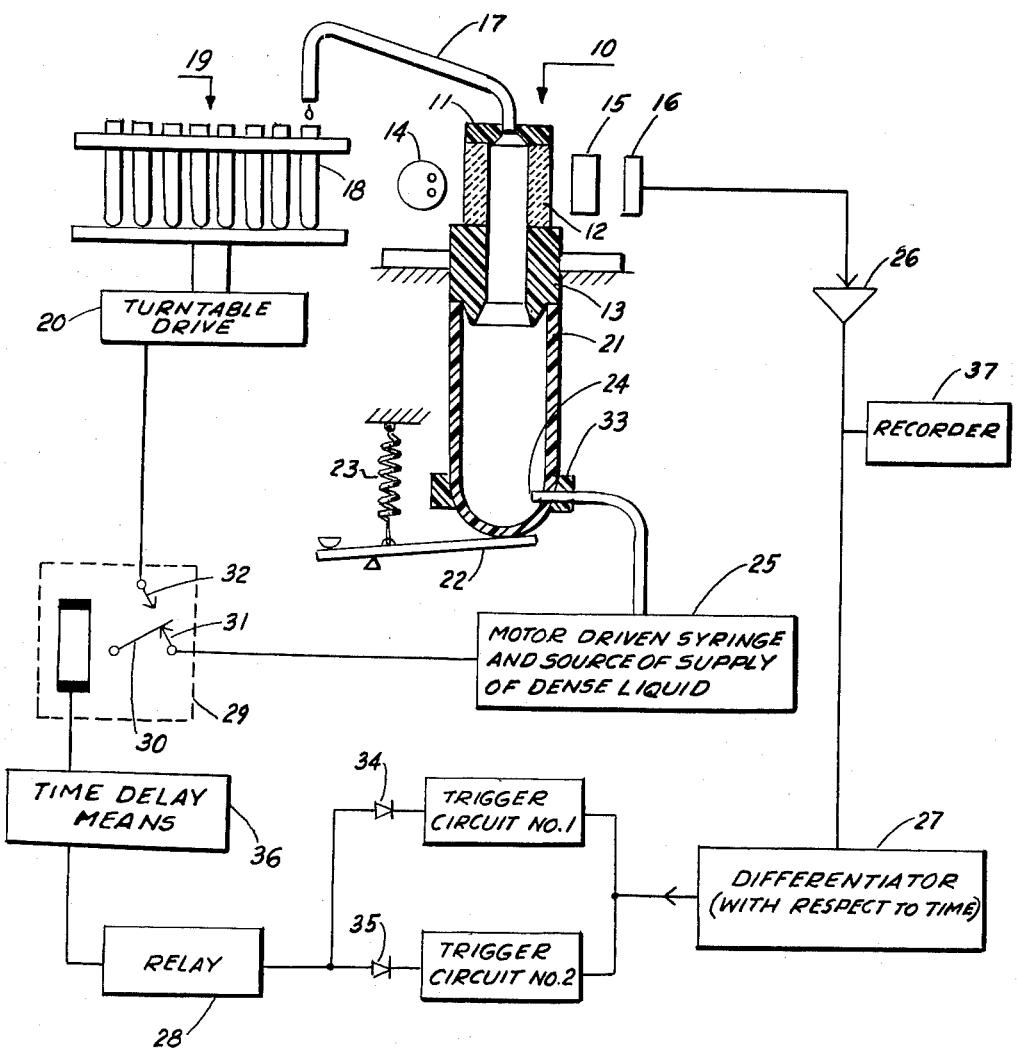
FIGURE 1 is a schematic representation of apparatus made in accordance with one embodiment of this invention.

Reference now is made to FIGURE 1 wherein there is shown an optical flow cell 10, preferably made of Teflon plastic, which is chemically inert and withstands temperatures of 200 degrees C. Alternatively, for certain applications, the cell can be made of acrylic plastic which is resistant to aqueous solutions and will withstand a temperature of 60 degrees C. In either case, the cell comprises a quartz window 12 (having a predetermined light path length), a cap 11 (having a tapered, central aperture formed therein), and a bushing 13 (having an integral, downwardly-depending annular ring portion of preferably triangular cross section). Means, not shown in the drawing, are provided for retaining the components in the illustrated, fixed, operative position while permitting easy disassembly thereof for cleaning. The window 12 is disposed in the light beam generated by a lamp 14, which beam passes through a filter 15 and impinges upon a photoelectric cell 16. Preferably, the lamp 14 is a low pressure mercury vapor lamp producing light having a predominant wave length of 254 millimicron and the filter 15 is designed to transmit very pure monochromatic light.

A delivery tube 17 has one end secured to the cap 11 (in alignment with the cap aperture) and the other end vertically spaced from a test tube 18. It may here be pointed out that a plurality of test tubes is carried by a conventional fraction collector which may consist of a turntable 19 having spaced discs provided with aligned holes for accommodating the test tubes in a circular row. Such turntable is mounted for rotation by a turntable drive means 20 provided with a suitable indexing mechanism whereby energization of the drive means rotates the turntable an angular distance such that the adjacent test tube is brought under the end of the delivery tube 17.

The centrifuge tube or container 21, preferably made of thin plastic and carrying the density gradient column with the discrete zones of macromolecules after centrifugation, is positioned such that its open end fits tightly over the tapered end of the bushing 13. This tube is retained in the illustrated, operative position by any suitable means permitting easy placement and removal of the tube, which means is represented in FIGURE 1 by the pivotally-mounted lever 22 and tension spring 23. In accordance with one aspect of the invention, the hollow needle 24 of the syringe is caused to puncture the tube 21 proximate to its bottom, after the tube is placed in its operating position. Leakage around the puncture may be prevented by placing an annular foam rubber gasket 33 around the tube and puncturing through the gasket. The syringe carries a supply of liquid having a specific gravity exceeding that of the densest liquid contained within the tube, which dense liquid is forced into the bottom of the tube at a predetermined rate, by a conventional motor-driven screw and gear train generally identified by the reference numeral 25 in the drawing. The entry of the dense liquid into the tube gradually floats the density gradient column out of the tube, through the optical window 12 and through the delivery tube 17.

As the liquid passes through the window 12, the quantity of light striking the photocell 16 will vary in correspondence with the light-absorbing character of the liquid. The photocell is connected to a current amplifier 26 which, in turn, is connected to a differentiator 27, the latter differentiating the voltage applied thereto by the amplifier with respect to time. With a constant light energy level falling upon the photocell as, for example, when no liquid passes through the cell 12, the output of the amplifier remains constant whereby the voltage output of the differentiator 27 is zero. However, as the liquid in the tube 21 is forced upwardly through the cell 12, a zone in the liquid, passing through the cell 12, will absorb a certain amount of the light energy whereby the light transmitted to the photocell is decreased, the light absorbing factor being related to the optical density of the liquid passing through the light beam at a particular time. Although the liquid is caused to flow through the cell 12 at a low rate, a decrease in the energy of the light striking the photocell produces an increase in the voltage output of the amplifier and such voltage increase causes a negative voltage to appear at the output of the differentiator 27. This negative voltage causes trigger circuit No. 1 to momentarily energize a relay 28. The relay 28 is energized through the diode 34 and the diode 35 prevents any electrical disturbance from reaching trigger circuit No. 2. The energization of relay 28 causes actuation of the relay 29 having contacts for the mutually exclusive energization of the motor driven syringe 25 and the turn table drive 20. Specifically, as diagrammatically shown in the drawing, when the relay 29 is in the normal, deenergized condition, electric power is supplied to the motor driven syringe through the normally-closed relay contacts 30 and 31. When the operating coil of relay 29 is energized, the movable contact 30 becomes disengaged from the stationary back contact 31, thereby cutting off the power to the motor driven syringe, and engages the stationary front contact 32, thereby applying power to the turntable drive. The turntable drive 20 includes a drive motor and appropriate indexing mechanism whereby upon the momentary closure of the relay contacts 31 and 32, the table 19, carrying the test tubes, is rotated, or otherwise actuated, to bring the next test tube into position under the end of the delivery tube 17. It will be apparent, now, that the flow of the dense liquid into the bottom of the centrifuge tube 21 and, consequently, the flow of liquid out of the delivery tube 17, is stopped prior to movement of the turntable. In order to allow time for the movement of the turntable through a complete indexing cycle before further discharge of liquid from the delivery tube, the drop-out of the relay is delayed somewhat as by means of a latch-in device which will not release the relay until the fraction collector has moved and then stopped. Such means could be by electrical connections to the turntable drive 20 which would supply power to the coil of relay 29 when the turntable drive 20 is operating.

When the light absorbance of the zone of liquid passing through the optical cell 12 reaches a maximum value, the voltage output of the amplifier remains constant whereby the output of the differentiator becomes zero. This causes trigger circuit No. 1 to return to its original state without any effect upon the relay 28 or trigger circuit No. 2 by reason of the polarity of the blocking diode 34.

As the particular zone of liquid under discussion passes through the cell 12, the light absorbance decreases, resulting in a decrease in the output voltage of the amplifier. This results in a positive voltage output from the differentiator which operates trigger circuit No. 2. However, operation of trigger circuit No. 2, in the forward direction, does not energize the relay 28 by reason of the reversely-poled blocking diode 35 and, consequently, the turntable remains stationary. When the light absorbing material has passed out of the cell 12, the light energy striking by photocell ceases to change whereby the output of the differentiator drops to zero. This causes trigger circuit No. 2 to return to the original state and the resulting, reverse direction pulse causes momentary operation of the relay 28 and relay 29 thereby stopping the flow of liquid from the delivery tube and bringing the next test tube into position. Diode 34 prevents any electrical disturbance from reaching trigger circuit No. 1.

It will now be clear that the described apparatus operates on the light-absorbing characteristic of the liquid being floated upwardly through the cell 12 to automatically collect in a single test tube a single zone of fluid contained in the density gradient tube. The automatic operation of the apparatus is independent of the base line of the optical density before and after a particular zone of light-absorbing material has passed through the optical cell. Further, successive peaks of light absorbance will result in the liquid zones producing such peaks being collected in separate test tubes, corresponding to each peak of the succession.

The apparatus shown in FIGURE 1 will function as described, provided the volumetric capacity of each collecting test tube is greater than the volume of any one zone of liquid contained in a particular centrifuge tube, or if additional, conventional, means are provided to move the fraction collector at fixed intervals, such intervals corresponding to a volume of delivery less than the capacity of a collecting tube. However, it may be desirable to compensate for the delivery lag between the optical cell 12 and the fraction collector. Specifically, the volume of the optical flow cell 12 and the delivery tube 17 causes the composition of the liquid reaching the collecting tube to lag behind that of the flow cell. This will cause the fluid in the collecting tube to differ from that effecting the photocell. In actual practice, the delivery volume lag is of the order of 0.7 milliliter. While a lag of this magnitude usually is not serious, it may be a factor when the light absorption peaks are of short duration, as is often the case with density gradient fractionation. For this reason, it may be desirable to include, in the apparatus, a time delay means 36 between the relay 29 and the relay 28. Such delay means may be of conventional design, such as, for example, a synchronous electric motor with associated, cam-operated switches which may be adjusted by the operator to delay operation of the turntable drive for a time period equal to the liquid transfer time between the optical cell and the collecting test tube.

A recorder 37 can be connected to the amplifier 26 for continuous measurement of the optical density of the liquid flowing through the optical cell 12. By properly coordinating the flow rate of the liquid with reference markings (which markings may be pre-printed on the recorder chart or automatically made thereon by conventional means each time the fraction collector moves), it is possible accurately to determine where a particular zone of liquid was located in the centrifuge tube 21 before fractionation and, also, in which of the several collecting tubes (on the fraction collector) the particular zone of liquid has been collected after the fractionation process.

Because of the uninterrupted and unobstructed vertical flow of the liquid from the centrifuge tube, there is little, if any, mixing of the flow stream. The mixing effect of the delivery tube 17 is minimized by inclining its discharge end upwardly at an angle, as shown in the drawing. The vertical density gradient column, with its inherent stability, is maintained and the discrete zones of liquid are not distorted by turbulence or the effect of laminar flow. The entire cross section of liquid tends to move at one discrete velocity.

Reference, now, is made to FIGURE 2, which is a simplified circuit diagram of the differentiator 27, the two trigger circuits and the relay 28. The differentiator circuit functions by operating upon the time derivative (slope or rate of change) of voltage which represents the optical density of the liquid flowing through the optical cell. Such voltage is obtained from the cathode of a conventional cathode follower section of the amplifier 26 (FIGURE 1) and is applied to capacitor 40. This capacitor, preferably a polystyrene dielectric capacitor, has a very high electrical leakage resistance. The output voltage from the capacitor, developed across one or both of the dropping resistors 41, 42 connected to the grid of the tube 43, approximates the time derivative of the optical density. A selector switch 44 having stationary contacts marked C, D and OFF is used to select the resistance values which determine the rate at which the time derivative is taken. A faster rate, with the smaller effective resistance connected in the circuit, preferably is used for density gradient fractionation, while the slower rate is used for column chromatography. This is because the light absorbance factor changes more slowly in column chromatography. The Zener diode 45 reversely conducts during any region of high negative voltage slope on the trailing edges of relatively large voltage peaks. This tends to reset the approximation of the time derivative to a lower absolute value so that it will have a near zero value shortly after a large voltage peak has passed. This decreases the delay in the automatic changing of collecting tubes after the passage of the voltage peak.

When the selector switch 44 is set to the OFF position, the grid of the tube 43 is connected to ground. This is done prior to adjusting of the derivative reference level by means of the rheostat 46 in the cathode circuit of the tube. The rheostat is set so that the anode potential is between the triggering levels of the double trigger circuits 47 and 48.

The double trigger circuits comprise the two tubes 50 and 51 (such as type 6BA7), with the input circuit connected to the anode of the differentiator tube 43 by the wire 52. It will be noted that the control grid 55, of the tube 51, is connected to the control grid 53 of the tube 50 through a resistor 54, whereby the control grid 55, of the tube 51, is biased at a higher potential than the grid 53. In consequence, the tube 51 triggers on a lower input voltage level than does the tube 50. The specific mechanism under which the two trigger circuits operate will be described in detail hereinbelow. For the present, it is pointed out that under quiescent conditions, the trigger tubes are in opposite stable states, with the anode of the tube 50 normally conducting and the anode of the tube 51 normally not conducting. A difference in potential between the two tubes causes the pilot lamp 56 to light.

When a light-absorbing zone of liquid starts to pass through the optical cell, the time derivative of the optical density is positive and a positive voltage, which represents the positive time derivative, is applied to the grid of the differentiator tube 43. This causes the anode potential of the tube to drop. When such voltage drops to the triggering level of the tube 51, its anode voltage suddenly drops as the anode triggers into conduction.

The relay 28 comprises a tube 57, such as a type 6C4, having the operating coil 58 of power relay 59 connected in the cathode circuit. The control grid of the tube 57 is connected to the anode circuit of the trigger tube 51 by a wire 60 and through the coupling diode 34 and the capacitor 61. When the trigger tube 51 conducts, the anode voltage suddenly drops with an attendant drop in the voltage applied to the control grid of the tube 57. This causes a momentary deenergization of the operating coil 58 of the relay 59 resulting in a momentary closure of the relay contacts 62, 63. Such contact closure results in the operation of the relay 29, see FIGURE 1, to stop the motor-driven syringe 25 and to effect operation of the turntable drive 20 to bring the next adjacent collecting tube into registry under the delivery tube 17.

As the voltage peak reaches its maximum value, its time derivative drops to zero and the trigger tube 51 reverts to its original state. The sudden rise in the anode potential, at this time, causes no circuit disturbance because the trigger tube is cut off from the rest of the circuit by the blocking action of the coupling diode 34.

As the voltage peak decreases back to zero, its time derivative is negative and the anode potential of the differentiator tube 43 rises. This causes a triggering of the trigger tube 50 and its anode current cut off. The anode potential rises sharply but the effect of the voltage rise is blocked from the relay 28 by the coupling diode 35. After the voltage peak has passed, the time derivative drops to zero and the trigger tube 50 reverts to its original state. This sudden lowering of the anode voltage of the tube 50 becomes effective on the grid of the relay tube 57 thereby again causing a momentary closure of the relay contacts 62, 63 and effecting an indexing operation of the fraction collector to bring the next collecting test tube under the end of the delivery tube.

The action of the trigger circuit will now be explained in somewhat more detail. Assume that the anode current of the trigger tube 51 is cut off because the potential on the secondary control grid 65 is considerably lower than the cathode potential. In this condition, almost all of the cathode current will flow in the screen grid 66. If the control grid 55 is made more negative, the cathode and screen current will drop and the screen grid voltage will rise. Such voltage rise will be transmitted by the voltage-dropping Zener diode 67 to the secondary control grid 65 bringing the latter closer to the cathode potential. This will cause some of the cathode current to flow in the anode 68 thus further decreasing the screen current. The action is cumulative, thus causing a sharp increase in the anode current and a consequent sharp drop in the anode potential.

Now, if the control grid 55 is made more positive, the screen current will increase and the screen voltage will drop. This voltage drop is translated to the secondary control grid 65 by the Zener diode 67, whereby the grid 65 becomes more negative and repels more of the cathode current towards the screen grid 66. This, then, tends to increase the screen current with an attendant drop in the screen potential. Such action is cumulative and the trigger tube sharply reverts to its original state with a substantially zero anode current and a high anode potential.

Reference, now, is made to FIGURE 3 showing the use of the apparatus in connection with the column chromatography process, like parts in the FIGURE 1 and FIGURE 3 arrangements being identified by like reference numerals. The hollow, vertically-disposed column 70, packed with appropriate material, is positioned over the tapered end of the bushing 13'. Alternatively, the column can be connected to the optical cell 12 by means of appropriate tubing. The homogeneous mixture of materials, dissolved in a solvent, is introduced onto the top of the column and the materials will migrate down the column at different rates, depending on time or the external changing of the solvent as it moves down through the column. The material discharged from the column will first contain the faster moving materials and then the slower. Thus, the liquid flowing through the optical cell 12 and the delivery tube 17', at any particular time, is usually of one species of material and/or pure solvents. Separation of the discharge flow into separate test tubes containing the different materials is accomplished automatically by the apparatus which has been described hereinabove in detail with reference to FIGURE 1.

Having described my invention, those skilled in this art will be able to change and modify the illustrated embodiments to meet specific conditions or applications. As an example, in the FIGURE 1 embodiment, it is possible to inject the dense solution into the bottom of the centrifuge tube through a hollow needle extending down into the tube from its top end. Also, the motor-driven syringe can be replaced by various other arrangements for forcing the dense liquid into the centrifuge tube at a predetermined, constant rate. Specifically, a manual hand crank drive can be used for advancing the syringe, with the crank cooperating with a suitably calibrated dial for determining the amount of liquid which has been delivered into the centrifuge tube. This latter arrangement can also be used in determining the volume of liquid between the optical cell and the end of the delivery tube. Additionally, cam-operated switches can be operated in accordance with rotation of the hand crank or motor drive to cause a positional change in the collecting test tubes.

Further, the photocell, etc., can be replaced with conventional sensing elements for other physical or chemical factors than light absorbance, such as conductivity, pH, redox potential, fluorescence, etc. This will allow automatic fractionation on the basis of these other properties of the flow stream.

The electrical output of this fractionator, normally used to cause actuation of the fraction collector, can be used for other purposes. An example is to start and stop an integrator to determine the area under each peak on the recording chart.

It is intended that these and other changes and modifications can be made without departing from the spirit and scope of the invention as recited in the following claims.

I claim:

1. Apparatus for transferring fractioned liquid material from a container into separate collecting tubes, which apparatus comprises means causing the material to flow out of the container and through a cell, sensing means producing an output signal in correspondence with changes in a predetermined characteristic of the liquid phase of the material passing through said cell, control means responsive to changes in the output signal of the sensing means, a rack carrying a plurality of adjacently-disposed collecting tubes, and drive means for moving the rack to position a collecting tube to receive material discharged from the said cell, said control means actuating the said drive means upon predetermined changes in the output signal of the sensing means.

2. The invention as recited in claim 1, including delay means for delaying the actuation of the drive means by the control means for a time period corresponding to the liquid transfer time between the cell and the collecting tube.

3. The invention as recited in claim 1, wherein the said control means comprises an electronic differentiator producing an output voltage of one polarity when the said predetermined factor of the material changes in one direction and an output voltage of opposite polarity when the said factor changes in the reverse direction, and including means interposed between the differentiator and the said drive means and effecting actuation of the drive means only in response to the output voltage of the differentiator.

4. The invention as recited in claim 1, wherein the sensing means comprises a photocell responsive to a monochromatic light beam passing through the cell and an amplifier having an input circuit connected to the photocell and an output circuit connected to the said control means.

5. The invention as recited in claim 4, wherein the said control means is an electronic differentiator producing an output voltage of one polarity when the amplifier output changes in one direction and an output voltage of opposite polarity when the amplifier output changes in the other direction, and including means interposed between the differentiator and the said drive means and effecting actuation of said drive means only in accordance with the output voltage of the differentiator.

6. The invention as recited in claim 1, wherein the means causing the material to flow out of the container is a liquid injected into one end of the said container at a constant predetermined rate.

7. The invention as recited in claim 6, wherein the container is a density gradient column, the said liquid has a density exceeding the maximum density of material within said column, and the said liquid is injected into the bottom of the column.

8. The invention as recited in claim 1, including means stopping the discharge of material from the said cell during the time that the said drive means is actuated by said control means.

9. Apparatus for transferring fractioned material from a container into separate collecting tubes comprising, an optical cell disposed at one end of the container and having a delivery tube extending therefrom; means causing the material to flow out of the container and through the optical cell and delivery tube; a light source disposed on one side of the said cell; a light filter disposed on the opposite side of the cell; a photocell receiving light passing through the filter; an amplifier producing an output voltage in correspondence with the output of the photocell; an electronic differentiator energized by the amplifier output and producing an output voltage of one polarity when the amplifier output voltage increases and of the reverse polarity when the amplifier output voltage decreases; a turntable carrying a plurality of adjacently-spaced collecting tubes; drive means adapted, when energized, to rotate the turntable and position a collecting tube under the end of the delivery tube; and control means effecting energization of said drive means in accordance with changes in the polarity of the differentiator output voltage.

10. The invention as recited in claim 9, including delay means for delaying the energization of the said drive means by the said control means for a time period corresponding to the liquid transfer time between the optical cell and the collecting tube.

11. The invention as recited in claim 9, including means stopping the discharge of material from the delivery tube when the said drive means is energized.

12. The invention as recited in claim 9, wherein the said container is a density gradient tube vertically disposed with the open upper end thereof communicating with the said optical cell; and wherein the said means causing the material to flow out of the density gradient tube is a liquid injected into the bottom of the gradient tube, which liquid has a density exceeding the maximum density of the material with the gradient tube.

13. The invention as recited in claim 9, wherein the said light source is a spectral lamp supplying light at discrete wavelengths and the said filter transmits only light of a selected wavelength.

14. The invention as recited in claim 9, wherein the said light source is a low pressure mercury vapor lamp supplying light having a wavelength of 254 millimicrons and the said filter transmits only light of such wavelength.

References Cited by the Examiner

UNITED STATES PATENTS

| | | | |
|---|---|---|---|
| 2,645,378 | 7/53 | Richter | 222—395 X |
| 2,672,271 | 3/54 | Gorham | 141—153 X |
| 2,750,092 | 6/56 | Grassmann et al. | 141—153 |
| 2,905,823 | 9/59 | Sparks | 88—14 X |
| 2,953,440 | 9/60 | Claudy | 88—14 X |
| 3,004,567 | 10/61 | Snow et al. | 141—153 X |

LAVERNE D. GEIGER, *Primary Examiner.*